United States Patent
Saheba et al.

(10) Patent No.: US 10,348,816 B2
(45) Date of Patent: Jul. 9, 2019

(54) DYNAMIC PROXY SERVER

(71) Applicant: ADP, LLC, Roseland, NJ (US)

(72) Inventors: Jigesh Saheba, Alpharetta, GA (US);
Roberto A. Masiero, Alpharetta, GA (US); Isabel Espina Carvajal, Haworth, NJ (US)

(73) Assignee: ADP, LLC, Roseland, NJ (US)

( * ) Notice: Subject to any disclaimer, the term of this patent is extended or adjusted under 35 U.S.C. 154(b) by 251 days.

(21) Appl. No.: 14/882,775

(22) Filed: Oct. 14, 2015

(65) Prior Publication Data
US 2017/0111444 A1    Apr. 20, 2017

(51) Int. Cl.
*H04L 29/06*    (2006.01)
*H04L 29/08*    (2006.01)

(52) U.S. Cl.
CPC ........ *H04L 67/1012* (2013.01); *H04L 63/102* (2013.01); *H04L 67/2852* (2013.01); *H04L 67/306* (2013.01)

(58) Field of Classification Search
CPC .......... H04L 67/1012; H04L 67/306; H04L 67/2852
See application file for complete search history.

(56) References Cited

U.S. PATENT DOCUMENTS

| | | | |
|---|---|---|---|
| 5,991,810 A | 11/1999 | Shapiro et al. | |
| 6,067,623 A | 5/2000 | Blakley, III et al. | |
| 6,539,396 B1 | 3/2003 | Bowman-Amuah | |
| 6,671,818 B1 | 12/2003 | Mikurak | |
| 7,322,040 B1 | 1/2008 | Olson et al. | |
| 7,409,393 B2 | 8/2008 | Gregoire et al. | |
| 7,519,684 B2 | 4/2009 | Backhouse et al. | |
| 7,581,248 B2 * | 8/2009 | Atkins ................. | H04L 29/06 726/18 |
| 7,711,641 B1 | 5/2010 | Seale, III et al. | |
| 7,769,996 B2 | 8/2010 | Randle et al. | |

(Continued)

FOREIGN PATENT DOCUMENTS

| | | |
|---|---|---|
| EP | 2270622 A2 | 1/2011 |
| WO | 0145049 A1 | 6/2001 |

(Continued)

OTHER PUBLICATIONS

"Understanding Your Business Credit Score," Experian Information Solutions, Inc., accessed Apr. 13, 2016, 1 page, accessed https://www.experian.com/small-business/business-credit-score.jsp.

(Continued)

*Primary Examiner* — Chris Parry
*Assistant Examiner* — Caroline H Jahnige
(74) *Attorney, Agent, or Firm* — Yee & Associates, P.C.

(57) ABSTRACT

A method and apparatus for facilitating access to a plurality of resources is provided. A message that includes a context resource identifier is received at a proxy server from a client through a gateway in communication with both the client and the proxy server. Access to a resource associated with an interface that is referenced by the context resource identifier is controlled by the proxy server using a profile that is dynamically built for a user of the client based on a plurality of resource profiles received from a plurality of interfaces in communication with the proxy server.

18 Claims, 10 Drawing Sheets

(56) References Cited

U.S. PATENT DOCUMENTS

| | | | |
|---|---|---|---|
| 7,818,435 B1* | 10/2010 | Jellinek | G06F 17/30902 709/203 |
| 7,860,781 B1 | 12/2010 | Bodi et al. | |
| 8,005,816 B2 | 8/2011 | Krishnaprasad et al. | |
| 8,064,906 B1 | 11/2011 | Bonner | |
| 8,069,435 B1 | 11/2011 | Lai | |
| 8,103,445 B2 | 1/2012 | Smith et al. | |
| 8,108,272 B2 | 1/2012 | Sorbe et al. | |
| 8,166,189 B1 | 4/2012 | McGuire | |
| 8,305,983 B2 | 11/2012 | Siegel et al. | |
| 8,359,266 B2 | 1/2013 | Seale, III et al. | |
| 8,392,330 B2 | 3/2013 | Sorbe et al. | |
| 8,577,914 B2 | 11/2013 | Hossain et al. | |
| 8,646,053 B2 | 2/2014 | Laertz et al. | |
| 8,719,562 B2 | 5/2014 | Randle et al. | |
| 8,788,414 B2 | 7/2014 | Sorbe et al. | |
| 8,818,887 B2 | 8/2014 | Ahlers et al. | |
| 8,863,156 B1 | 10/2014 | Lepanto et al. | |
| 8,977,652 B2 | 3/2015 | Hoefner et al. | |
| 10,007,953 B1 | 6/2018 | Nathoo et al. | |
| 10,083,489 B1 | 9/2018 | Nathoo et al. | |
| 10,185,946 B2 | 1/2019 | Bowman et al. | |
| 2001/0023414 A1 | 9/2001 | Kumar et al. | |
| 2001/0034782 A1 | 10/2001 | Kinkade | |
| 2002/0046352 A1 | 4/2002 | Ludwig | |
| 2002/0083342 A1 | 6/2002 | Webb et al. | |
| 2002/0156777 A1 | 10/2002 | Raju | |
| 2002/0161764 A1 | 10/2002 | Sharo | |
| 2003/0069839 A1 | 4/2003 | Whittington et al. | |
| 2004/0030627 A1 | 2/2004 | Sedukhin | |
| 2004/0102182 A1 | 5/2004 | Reith et al. | |
| 2004/0267660 A1 | 12/2004 | Greenwood et al. | |
| 2006/0010442 A1* | 1/2006 | Desai | H04L 63/10 718/100 |
| 2006/0020508 A1 | 1/2006 | Gorti et al. | |
| 2006/0026114 A1 | 2/2006 | Gregoire et al. | |
| 2006/0026286 A1 | 2/2006 | Lei et al. | |
| 2006/0053290 A1 | 3/2006 | Randle et al. | |
| 2006/0074793 A1 | 4/2006 | Hibbert et al. | |
| 2006/0101474 A1 | 5/2006 | Magown | |
| 2006/0107036 A1 | 5/2006 | Randle et al. | |
| 2006/0136595 A1 | 6/2006 | Satyavolu | |
| 2006/0173985 A1 | 8/2006 | Moore | |
| 2007/0033127 A1 | 2/2007 | Masuyama et al. | |
| 2007/0050201 A1 | 3/2007 | Gardner et al. | |
| 2007/0162369 A1 | 7/2007 | Hardison | |
| 2007/0162674 A1 | 7/2007 | Leichsenring et al. | |
| 2007/0174191 A1 | 7/2007 | Keaton | |
| 2007/0282724 A1 | 12/2007 | Barnes et al. | |
| 2007/0288253 A1 | 12/2007 | Cobb et al. | |
| 2008/0021750 A1 | 1/2008 | Masuyama et al. | |
| 2008/0133914 A1 | 6/2008 | Isaacson et al. | |
| 2008/0177592 A1 | 7/2008 | Masuyama et al. | |
| 2008/0222238 A1* | 9/2008 | Ivanov | H04L 67/16 709/202 |
| 2008/0249902 A1 | 10/2008 | Lehman et al. | |
| 2008/0276304 A1 | 11/2008 | Maffione et al. | |
| 2009/0157542 A1 | 6/2009 | Ingerman et al. | |
| 2009/0164352 A1 | 6/2009 | Sorbe et al. | |
| 2009/0164353 A1 | 6/2009 | Sorbe et al. | |
| 2010/0125852 A1 | 5/2010 | Grant et al. | |
| 2010/0131412 A1 | 5/2010 | Bradley et al. | |
| 2010/0205093 A1 | 8/2010 | Seale, III et al. | |
| 2010/0223471 A1 | 9/2010 | Fresko et al. | |
| 2010/0235271 A1 | 9/2010 | Ghosh et al. | |
| 2010/0280946 A1 | 11/2010 | Batten | |
| 2011/0238477 A1 | 9/2011 | Urbanski | |
| 2011/0314546 A1 | 12/2011 | Aziz et al. | |
| 2012/0023569 A1* | 1/2012 | Spicer | H04L 41/28 726/12 |
| 2012/0047066 A1 | 2/2012 | Sorbe et al. | |
| 2012/0198512 A1* | 8/2012 | Zhou | H04L 47/122 726/1 |
| 2012/0239553 A1 | 9/2012 | Gonen et al. | |
| 2013/0019018 A1 | 1/2013 | Rice | |
| 2013/0099891 A1 | 4/2013 | Nandakumar | |
| 2013/0104197 A1 | 4/2013 | Nandakumar | |
| 2013/0212278 A1 | 8/2013 | Marshall et al. | |
| 2013/0346472 A1 | 12/2013 | Wheeldon | |
| 2014/0040993 A1 | 2/2014 | Lorenzo et al. | |
| 2014/0279384 A1 | 9/2014 | Loevenich | |
| 2015/0026236 A1* | 1/2015 | Solter | H04L 63/0892 709/203 |
| 2015/0052041 A1 | 2/2015 | Boyanov | |
| 2015/0081522 A1 | 3/2015 | Shinar et al. | |
| 2015/0201027 A1* | 7/2015 | Bell | H04L 63/10 713/172 |
| 2015/0358331 A1* | 12/2015 | Rachalwar | H04L 63/105 726/7 |
| 2016/0048929 A1 | 2/2016 | Parento et al. | |
| 2016/0092981 A1 | 3/2016 | Ghosh et al. | |
| 2016/0189119 A1 | 6/2016 | Bowman | |
| 2016/0210600 A1 | 7/2016 | Sobek | |
| 2016/0366134 A1* | 12/2016 | Hughes | H04M 15/00 |
| 2017/0068421 A1 | 3/2017 | Carlson | |
| 2017/0132700 A1 | 5/2017 | Kazerani et al. | |
| 2017/0187723 A1 | 6/2017 | Islam et al. | |
| 2017/0301013 A1 | 10/2017 | Alejo et al. | |

FOREIGN PATENT DOCUMENTS

| | | |
|---|---|---|
| WO | 2012040341 A3 | 3/2012 |
| WO | 2012119620 A1 | 9/2012 |

OTHER PUBLICATIONS

Office Action, dated Jun. 16, 2017, regarding U.S. Appl. No. 14/882,819, 31 pages.

Saheba et al., "Customized Web Services Gateway," U.S. Appl. No. 14/882,819, filed Oct. 14, 2015, 59 pages.

Shaeba et al., "Dynamic Application Programming Interface Builder," U.S. Appl. No. 14/882,952, filed Oct. 14, 2015, 70 pages.

Saheba et al., "Enterprise Application Ecosystem Operating System," U.S. Appl. No. 14/882,740, filed Oct. 14, 2015, 77 pages.

Notice of Allowance, dated Aug. 29, 2017, regarding U.S. Appl. No. 14/882,952, 18 pages.

Final Office Action, dated Oct. 17, 2017, regarding U.S. Appl. No. 14/882,819, 26 pages.

Office Action, dated May 24, 2018, regarding U.S. Appl. No. 14/882,819, 36 pages.

Final Office Action, dated Jul. 20, 2018, regarding U.S. Appl. No. 14/882,819, 38 pages.

Final Office Action, dated Sep. 25, 2018, regarding U.S. Appl. No. 14/882,740, 19 pages.

Office Action, dated Feb. 26, 2018, regarding U.S. Appl. No. 14/882,740, 32 pages.

Office Action, dated Feb. 7, 2019, regarding U.S. Appl. No. 15/099,896, 45 pages.

* cited by examiner

DYNAMIC PROXY SERVER

CROSS-REFERENCE TO RELATED APPLICATIONS

This application is related to the following patent applications: entitled "Customized Web Services Gateway", Ser. No. 14/882,819; entitled "Dynamic Application Programming Interface Builder", Ser. No. 14/882,952; and entitled "Enterprise Application Ecosystem Operating System", Ser. No. 14/882,740; filed even date hereof and assigned to the same assignee. Each of the aforementioned applications is incorporated herein by reference in its entirety.

BACKGROUND INFORMATION

1. Field

The present disclosure relates generally to a web services system and, in particular, to a proxy server within a web services system. Still more particularly, the present disclosure relates to a method and apparatus for facilitating client access to a plurality of resources using a proxy server.

2. Background

Many organizations use different software systems for various purposes related to information discovery, business management, and other types of operations. Software systems often exchange data with each other. A web services architecture enables these software systems to exchange this data over one or more computer networks. A software system that requests data may be referred to as a service requester. The software system that processes the request and provides the data may be referred to as a service provider.

The exchange of data between service requestors and service providers may occur over one or more computer networks, which may include the Internet, some other type of public network, a private network, or some combination thereof. Managing multiple service requestors and multiple service providers over time may be more difficult and time-consuming than desired. This type of management may be especially time-consuming and difficult when the service providers belong to a private network and one or more of the service requestors belong to a public network.

For example, in some cases, only certain service requestors may be authorized to access or exchange data with a particular service provider that belongs to a private network. The policy governing which service requestors are and which service requestors are not authorized to access a particular service provider may be managed by an application programming interface (API) associated with the particular service provider.

When a service requestor tries to access multiple service providers, determining whether the service requestor is authorized to access each of those multiple service providers may be more difficult and time-consuming than desired. For example, some currently available methods of authorization may require manual configuration for each service requestor that is trying to access a service provider.

Time delays in providing authorizations to service requestors may lead to time delays of tasks that users of the service requestors want to perform. When the users are employers, employees, organization members, corporate personnel, or members of other types of business entities, these time delays may affect overall performance and operational efficiency of the users and business entities. Therefore, it would be desirable to have a method and apparatus that take into account at least some of the issues discussed above, as well as other possible issues.

SUMMARY

In one illustrative example, a method for facilitating access to a plurality of resources is provided. A message that includes a context resource identifier is received at a proxy server from a client through a gateway in communication with both the client and the proxy server. Access to a resource associated with an interface that is referenced by the context resource identifier is controlled by the proxy server using a profile that is dynamically built for a user of the client, based on a plurality of resource profiles received from a plurality of interfaces in communication with the proxy server.

In another illustrative example, an apparatus comprises a plurality of resources and a proxy server in communication with the plurality of resources. The proxy server receives a message that includes a context resource identifier from a client through a gateway in communication with both the client and the proxy server. The proxy server controls access to a resource associated with an interface that is referenced by the context resource identifier using a profile that is dynamically built for a user of the client, based on a plurality of resource profiles received from the plurality of interfaces in communication with the proxy server.

In yet another illustrative example, a dynamic proxy server includes a message manager, an authorization manager, and a router. The message manager receives a message that includes a context resource identifier from a client through a gateway in communication with both the client and the dynamic proxy server. The authorization manager determines whether a user of the client is authorized to access a resource associated with an interface that is referenced by the context resource identifier using a profile that is dynamically built for the user of the client based on a plurality of resource profiles received from a plurality of interfaces in communication with the dynamic proxy server. The router routes the message to the resource after the user has been authorized to access the resource.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
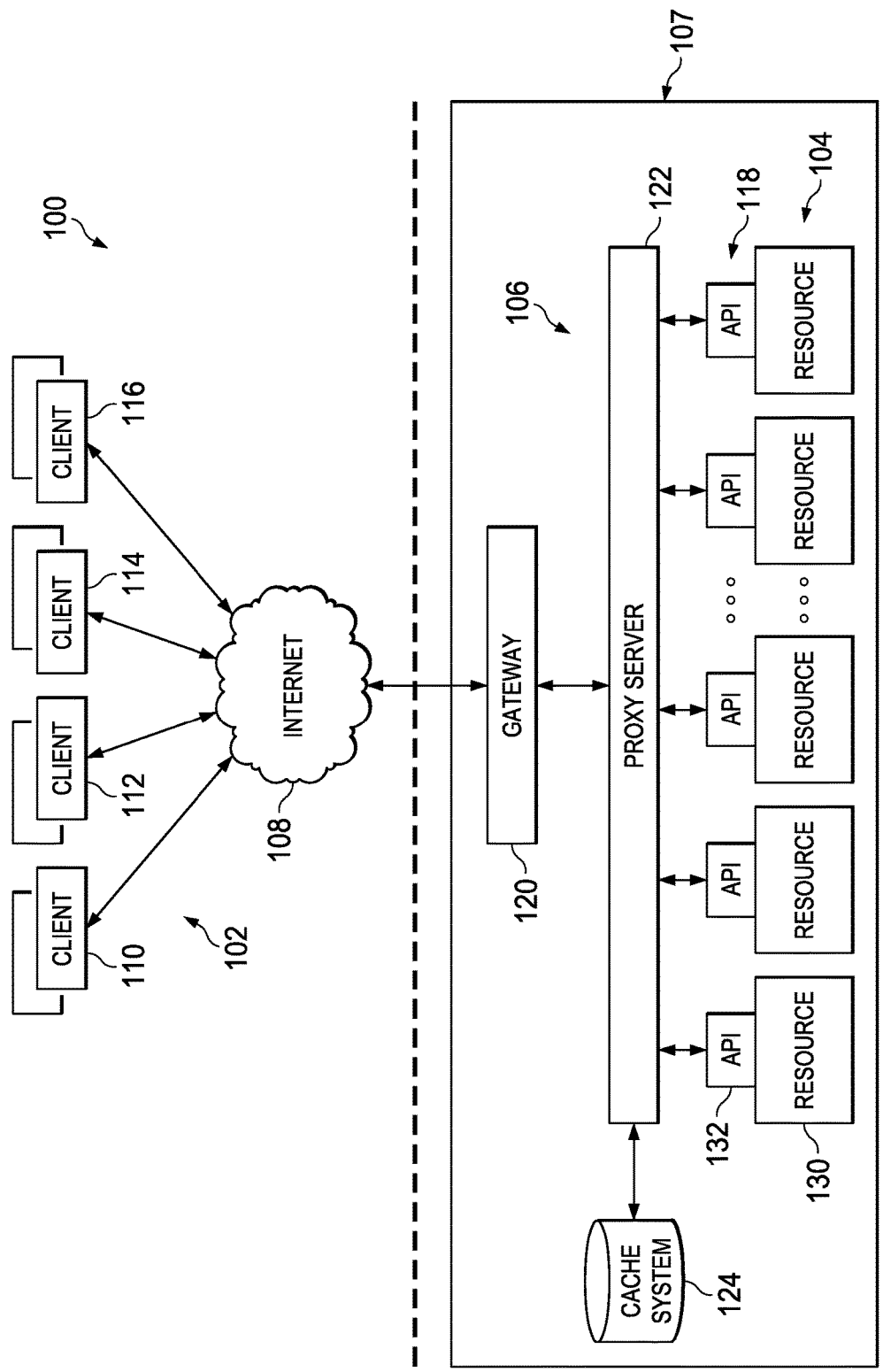
FIG. 1 is an illustration of a web services system in the form of a block diagram in accordance with an illustrative embodiment.

The illustrative embodiments recognize and take into account different considerations. For example, the illustrative embodiments recognize and take into account that it may be desirable to facilitate the exchange of data between multiple service requestors and multiple service providers in a manner that saves time and reduces the overall difficulty associated with this process. In these illustrative examples, service requestors may be referred to as clients and service providers may be referred to as resources.

Thus, the illustrative embodiments provide a method and apparatus for facilitating the exchange of data between clients and resources. The illustrative embodiments recognize and take into account that a proxy server may be used to facilitate access to resources. The proxy server may be a multi-purpose, dynamic proxy server. In some cases, the proxy server may be referred to as a web proxy server, an application programming interface (API) proxy server, or an intelligent application programming interface (API) proxy server.

The proxy server may decouple communication between application programming interfaces (APIs) and the clients. In computer programming, an API is a set of routines, protocols, or tools used for building software applications. An API may express a software component in terms of its operations, inputs, outputs, and underlying types. An API may define functionalities that are independent of their respective implementations, which allows definitions and implementations to vary without compromising an interface. An API may make developing a software program easier by providing the building blocks for the software program. A programmer, or another software program, can then put the blocks together.

The proxy server may dynamically discover application programming interfaces associated with resources that are connected to the proxy server and build authorization profiles for users as desired based on requests for access to the resources that are received from clients. In this manner, the proxy server may provide a way for dynamically authorizing access to resources that reduces time delays typically associated with authorization processes.

The proxy server may improve the efficiency of and time involved in managing authorizations of clients and authorizations of the users of the clients. In this manner, the overall time taken by a user to perform a task using a particular resource may be reduced. Thus, overall performance and operational efficiency of the user and an entity, such as a business entity to which the user belongs, may be improved.

As one illustrative example, managing the accessing of a group of human resource services by client applications being used by multiple employees and employers may be more time-consuming than desired, may require more processing resources than desired, and may slow down or impede communications network traffic more than desired. The illustrative embodiments recognize and take into account that a proxy server that is capable of building profiles for users of the client applications and dynamically updating those profiles over time in response to changes in the application programming interfaces associated with the human resource services may be desirable.

In one illustrative example, the proxy server provided by the illustrative embodiments may process requests for access to the human resource services based on dynamic discovery of application programming interfaces connected to the proxy server at the time the request is processed. In this manner, these profiles may be updated over time to keep up with changes or modifications to these application programming interfaces. The profiles may be used to generate responses to requests for access to the human resource services that may be sent to the client applications. These responses contain the data requested by the client applications.

The illustrative embodiments also provide a gateway for facilitating communication between clients and the proxy server. The gateway may be used to provide an initial level of authorization for a client and a user of the client prior to any request being sent from a client to the proxy server. Further, the gateway may also be used to transform the uniform resource identifier (URI) in a message requesting access to a resource referenced by the uniform resource identifier into a context resource identifier.

A uniform resource identifier may take the form of a web address, a universal resource identifier, a uniform resource locator, or some other type of identifier. The illustrative embodiments recognize that uniform resource identifiers that reference application programming interfaces, and thereby, the resources associated with these application programming interfaces, may change over time. Consequently, it may be desirable to have a fixed way of referencing these resources.

The gateway may transform each uniform resource identifier into a context resource identifier. The context resource identifier provides consistent naming for the resource. The context resource identifier may be represented or defined within the scope of a larger domain for an entity. For example, when the entity is a business entity involved with human capital management (HCM), the context resource identifier may be represented or defined within the scope of the human capital management.

The uniform resource identifier and the context resource identifier may both reference the same resource, but only the context resource identifier may remain unchanged over time. In this manner, the proxy server may not need to track changes to the uniform resource identifiers over time. The proxy server may use the context resource identifier to call an application programming interface.

Thus, the illustrative embodiments provide a method and apparatus for facilitating communication between a client and a resource. In one illustrative example, a method and apparatus for facilitating communication between a client and a proxy server is provided. A message is received from a client at a gateway. The message includes a uniform resource identifier that references an interface associated with a resource. The gateway transforms the uniform resource identifier into a context resource identifier that also references the interface. The gateway performs an initial authorization check for the client and a user of the client with respect to the interface. The gateway inserts the context resource identifier into the message to form a modified message in response to a successful initial authorization check. The gateway sends the modified message to the proxy server.

In another illustrative example, a method and apparatus are provided for facilitating access to a plurality of resources. A message that includes a context resource identifier is received at a proxy server from a client through a gateway in communication with both the client and the proxy server. Access to a resource associated with an interface that is referenced by the context resource identifier is controlled by the proxy server using a profile that is dynamically built for a user of the client based on a plurality of resource profiles received from a plurality of interfaces in communication with the proxy server.

Referring now to the figures and, in particular, with reference to FIG. 1, an illustration of a web services system is depicted in the form of a block diagram in accordance with an illustrative embodiment. In this illustrative example, web services system 100 is an example of a system that enables communications between various software systems through one or more computer networks.

The one or more computer networks may include at least one of the Internet, a private network, a public network, or some other type of network. As used herein, the phrase "at least one of," when used with a list of items, means different combinations of one or more of the listed items may be used, and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

In this illustrative example, web services system 100 enables communications between plurality of clients 102 and plurality of resources 104. Each client of plurality of clients 102 may also be referred to as a service requestor. Each resource of plurality of resources 104 may also be referred to as a service provider that provides one or more services. In this manner, plurality of clients 102 and plurality of resources 104 may also be referred to as a plurality of service requestors and a plurality of service providers, respectively.

Each client of plurality of clients 102 and each resource of plurality of resources 104 may take the form of software. Further, each client in plurality of clients 102 and each resource of plurality of resources 104 may be run on one or more computer devices. For example, a client of plurality of clients 102 may be implemented on hardware that includes at least one of a computer system, a processor unit, a microprocessor, a tablet, a laptop, a smart television, a smartphone, or some other type of data processing system or electronic device. Similarly, a resource of plurality of resources 104 may be implemented on hardware that includes at least one of a computer system, a processor unit, a microprocessor, a tablet, a laptop, a smart television, a smartphone, a server, or some other type of data processing system or electronic device.

In this illustrative example, plurality of resources 104 are affiliated with entity 106. Entity 106 may take the form of, for example, without limitation, a business entity, an organization, a corporation, or some other type of entity.

As depicted, plurality of resources 104 may be connected to internal network 107. In this illustrative example, internal network 107 may be in communication with Internet 108. Internet 108 may refer to the common use of the term "Internet." In some cases, Internet 108 may refer to a group of networked computers or a group of interconnected computer networks. Plurality of clients 102 may attempt to access plurality of resources 104 through Internet 108.

As depicted, plurality of clients 102 includes client 110, client 112, client 114, and client 116. Client 110, client 112, client 114, and client 116 may be affiliated with the same entity or different entities. In other illustrative examples, one or more of client 110, client 112, client 114, and client 116 may be affiliated with entity 106. In one illustrative example, each of these clients may take the form of a consumer application, an email client, a web browser, a login application, or some other type of software component.

Web services system 100 includes plurality of resources 104, plurality of interfaces 118 associated with plurality of resources 104, gateway 120, proxy server 122, and cache system 124. Each resource of plurality of resources 104, each interface of plurality of interfaces 118, gateway 120, proxy server 122, and cache system 124 may be connected to internal network 107. A resource in plurality of resources 104 may take the form of, for example, without limitation, a human resources service, a payroll service, an employee benefits service, a search engine, a research service provider, a governmental service provider, or some other type of service provider.

Each interface in plurality of interfaces 118 is associated with a corresponding resource of plurality of resources 104. In this illustrative example, each interface in plurality of interfaces 118 may also be referred to as an application programming interface (API). In this manner, plurality of resources 104 may also be referred to as a plurality of application programming interfaces (APIs).

Gateway 120 and proxy server 122 may be used to facilitate communications between plurality of clients 102 and plurality of resources 104. Gateway 120 and proxy server 122 may each be implemented using software, hardware, firmware, or a combination thereof. Depending on the implementation, gateway 120 and proxy server 122 may be implemented on the same computer device or on different computer devices that are in communication with each other. In this illustrative example, gateway 120 and proxy server 122 may communicate over internal network 107. However, in other illustrative examples, gateway 120 may communicate with proxy server 122 over Internet 108.

In one illustrative example, client 112 may send a request for access to data provided by resource 130 over Internet 108 to gateway 120. Gateway 120 uses the request to identify interface 132 associated with resource 130. Gateway 120 then performs an initial authorization check of both client 112 and the user of client 112 with respect to interface 132.

If gateway 120 determines that client 112 and the user of client 112 are authorized to access interface 132, gateway 120 passes along the request to proxy server 122.

Proxy server 122 performs another level of authorization and ultimately controls access to resource 130. In particular, proxy server 122 performs a profile-based authorization for the user of client 112. Once the user of client 112 has been authorized, proxy server 122 routes the request received from client 112 to resource 130. Proxy server 122 may then receive a response that includes the requested data from resource 130. Proxy server 122 then sends this response to gateway 120, which then sends the response to client 112 over Internet 108.

Proxy server 122 may be configured to dynamically discover new resources over time that are added to plurality of resources 104. Further, proxy server 122 may be configured to discover new services that are offered by resources over time.

The addition of new resources to plurality of resources 104 that are in communication with and recognized by proxy server 122 may be handled by proxy server 122 in different ways. In one illustrative example, a centralized service directory may be used to manage plurality of resources 104. In another illustrative example, a broadcast and discovery method may be used to manage plurality of resources 104.

With a centralized service directory, new resources may be registered using a uniform interface that enables proxy server 122 to discover these resources. In some cases, new services that are provided by a previously registered resource may be registered using this uniform interface. A resource that provides a service may be responsible for maintaining the registration of that service in the centralized service directory. In this manner, a resource that provides a service may be ultimately responsible for maintaining the freshness of data stored in the centralized service directory for that service.

With the broadcast and discovery method, a resource may broadcast the presence of a service when the resource is connected to internal network 107, Internet 108, or both. This type of broadcasting allows discovery of the resource and the services provided by that resource by proxy server 122. In one illustrative example, a uniform interface may be used to discover resources for which broadcasts have been detected, the services for which broadcasts have been detected, or both.

Proxy server 122 may be in communication with cache system 124. Cache system 124 may include any number of caches. Proxy server 122 may use cache system 124 to store profiles for users and other types of information.

In these illustrative examples, web services system 100 formed by proxy server 122 and gateway 120 takes the form of a dynamic and distributed web services system. This dynamic and distributed web services system facilitates communications between plurality of clients 102 and plurality of resources 104, while allowing clients and resources to join and leave the dynamic and distributed web services system over time. In other words, the functions performed by proxy server 122 and gateway 120 enable clients to connect to or disconnect from gateway 120 and resources to connect to or disconnect from proxy server 122 in an organic and fluid manner over time. This type of dynamic and distributed web services system may reduce the overall time and processing resources needed to facilitate communications between clients and resources.

The functions performed by gateway 120 are described in greater detail below in FIG. 2. Further, the functions performed by proxy server 122 are described in greater detail below in FIG. 3.

Figure 2:
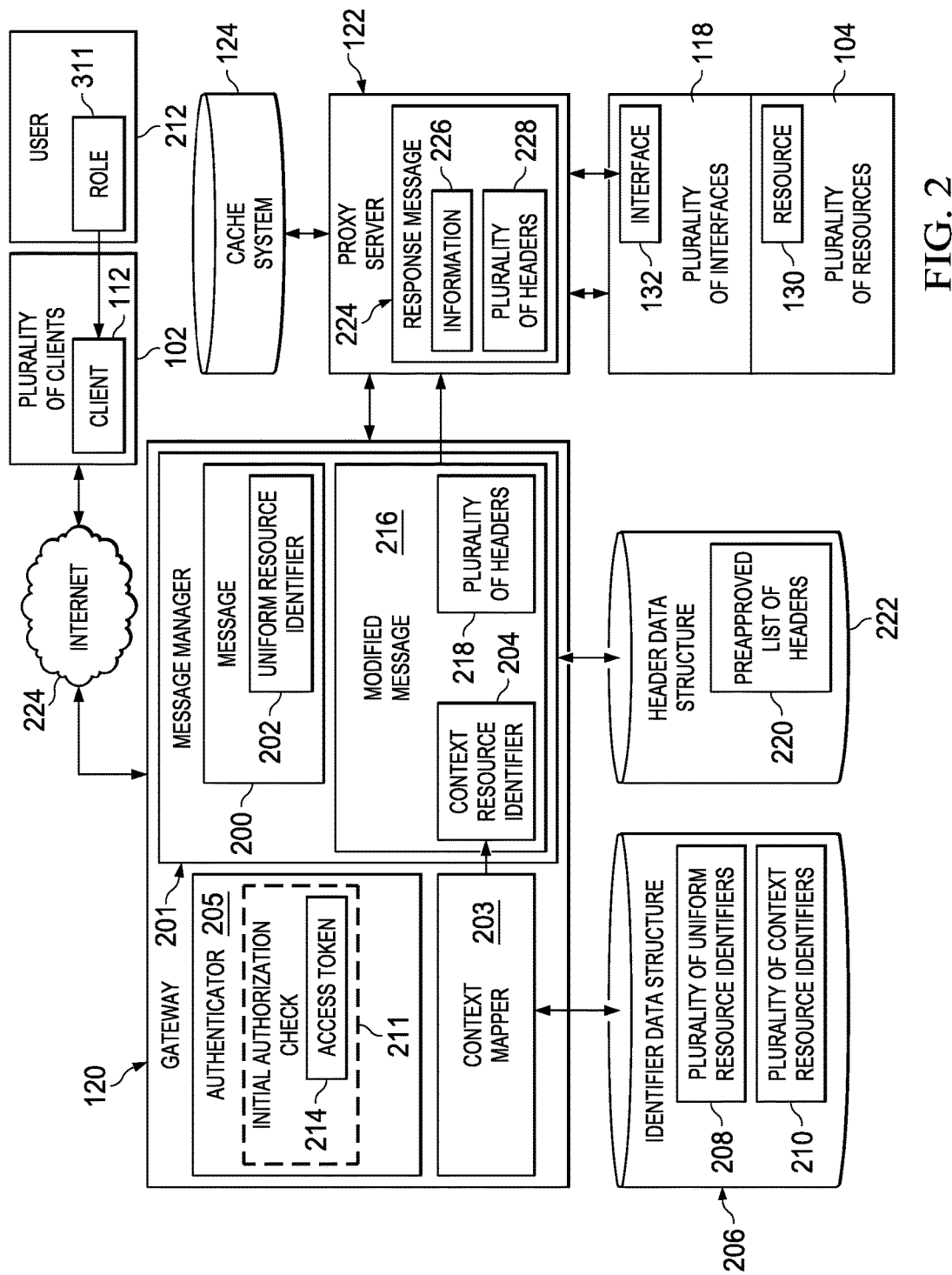
FIG. 2 is an illustration of a gateway in the form of a block diagram in accordance with an illustrative embodiment.

With reference now to FIG. 2, an illustration of gateway 120 from FIG. 1 is depicted in the form of a block diagram in accordance with an illustrative embodiment. As depicted, gateway 120 is in communication with Internet 108 and proxy server 122. Gateway 120 is implemented such that gateway 120 is customized. In some cases, gateway 120 may be referred to as a customized web services gateway.

Gateway 120 includes message manager 201, context mapper 203, and authenticator 205. Each of message manager 201, context mapper 203, and authenticator 205 may be implemented using software, hardware, firmware, or a combination thereof.

Message manager 201 of gateway 120 receives message 200 from client 112 from FIG. 1. In one illustrative example, message 200 may include a request for access to data that is provided by at least one resource of plurality of resources 104 in FIG. 1.

As depicted, message 200 also includes uniform resource identifier (URI) 202 that references the particular resource of plurality of resources 104 in FIG. 1 from which the data is being requested. In this illustrative example, uniform resource identifier 202 references, or represents, interface 132 associated with resource 130 from FIG. 1. Thus, uniform resource identifier 202 also references resource 130 associated with interface 132.

Context mapper 203 of gateway 120 transforms uniform resource identifier 202 into context resource identifier 204 that also references interface 132, and thereby, resource 130. For example, without limitation, context mapper 203 of gateway 120 may have access to identifier data structure 206 that stores plurality of uniform resource identifiers 208 and plurality of context resource identifiers 210. Identifier data structure 206 may take the form of a table, a spreadsheet, a database, a word document, a cache, a data store, or some other type of data structure.

Each uniform resource identifier in plurality of uniform resource identifiers 208 may match to a corresponding context resource identifier in plurality of context resource identifiers 210 in identifier data structure 206. Each corresponding pair of uniform resource identifier and context resource identifier may reference a same interface and thereby, a same resource.

The uniform resource identifier that references a particular interface, and thereby, a particular resource, may change over time. However, the corresponding context resource identifier that references that particular interface, and thereby, that particular resource, may remain static and fixed over time.

Context mapper 203 uses uniform resource identifier 202 in message 200 to look up the corresponding context resource identifier 204 in identifier data structure 206. In one illustrative example, context resource identifier 204 may include elements that more descriptively reference interface 132 and thereby resource 130, as compared to uniform resource identifier 202.

For example, without limitation, context resource identifier 204 may be represented or defined within the scope of a larger domain for entity 106. In one illustrative example, when entity 106 is a business entity involved with human capital management, context resource identifier 204 may be represented or defined within the scope of the human capital management domain. Context resource identifier 204 may take the form of a functional decomposition of the human capital management domain to provide clarity and uniqueness with respect to this domain. In some illustrative examples, context resource identifier 204 may have a format similar to uniform resource identifier 202 for ease and understanding.

As one illustrative example, context resource identifier 204 may be comprised of segments including, but not limited to, a domain segment, a service segment, a feature segment, a function segment, and an operation segment. One illustrative example for context resource identifier 204 may be as follows:

"/hr/workerInformationManagement/workerManagement/addressManagement/worker.legalAddress.change."

In this manner, context resource identifier 204 may describe the overall intent of uniform resource identifier 202. In some cases, context resource identifier 204 may also be referred to as a canonical identifier for interface 132.

In other illustrative examples, plurality of uniform resource identifiers 208 may not be stored in identifier data structure 206. Instead, context mapper 203 may use one or more algorithms to transform a particular uniform resource identifier into one of plurality of context resource identifiers 210.

Authenticator 205 of gateway 120 performs initial authorization check 211 for client 112 and user 212 of client 112 with respect to interface 132 referenced by context resource identifier 204. User 212 may be an employer, an employee, a member of an organization, a member of a corporation, a team member, a consumer, a supplier, or some other type of user.

For example, authenticator 205 determines whether client 112 is authorized to access interface 132 referenced by context resource identifier 204. This determination may be based on a number of different factors, which may include, for example, at least one of the particular device on which client 112 is being run, the type of client 112, a current time of day, a current date, or some other type of factor.

Further, authenticator 205 determines whether user 212 of client 112 is authorized to access interface 132 referenced by context resource identifier 204. Various factors may be used to determine whether user 212 is authorized to access interface 132. As one illustrative example, authenticator 205 may confirm whether user 212 has a subscription to resource 130 associated with interface 132 that is in good order.

In some illustrative examples, authenticator 105 may validate a subscription corresponding to client 112 with respect to context resource identifier 204, and thereby, with respect to resource 130. The subscription may be, for example, held by an organization that uses or manages client 112. The subscription may grant client 112 access to one or more resources for a specified period of time. In one illustrative example, authenticator 105 determines whether a subscription corresponding to client 112 is valid or invalid based on at least one of whether the subscription has expired, whether the subscription restricts access to certain resources, or some other factor.

If both client 112 and user 212 are authorized to access interface 132, authenticator 205 sends access token 214 to client 112 over Internet 108. Client 112 receives access token 214. Client 112 may then send access token 214 back to gateway 120 through Internet 108 so that authenticator 205 can authenticate both client 112 and user 212. In some cases, client 112 may resend message 200 with access token 214. This authentication completes initial authorization check 211.

In response to a successful initial authorization check 211, message manager 201 inserts context resource identifier 204 into message 200 to form modified message 216. Message manager 201 then sends modified message 216 to proxy server 122 for processing. Proxy server 122 may only use context resource identifier 204 in modified message 216 to call interface 132 and may not need to look at or use uniform resource identifier 202. Changes to uniform resource identifiers over time may not affect the manner in which proxy server 122 interacts with plurality of interfaces 118 from FIG. 1.

In some illustrative examples, message manager 201 may further modify message 200 before sending modified message 216 to proxy server 122. For example, message manager 201 may check plurality of headers 218 in modified message 216 based on preapproved list of headers 220 stored in header data structure 222. Message manager 201 may then filter out any header in plurality of headers 218 that is not on preapproved list of headers 220. In other illustrative examples, message manager 201 may perform this filtering of plurality of headers 218 in message 200 prior to context resource identifier 204 being inserted into message 200 to form modified message 216.

Proxy server 122 processes modified message 216. Proxy server 122 performs another level of authorization checking. If this authorization check is successful, proxy server 122 routes modified message 216 to resource 130.

Resource 130 may then send response message 224 to proxy server 122. Response message 224 contains information 226 provided by resource 130 in response to the request contained in modified message 216. Proxy server 122 sends response message 224 to gateway 120.

Message manager 201 of gateway 120 receives response message 224 and sends response message 224 to client 112. In some cases, message manager 201 may filter plurality of headers 228 in response message 224 before sending response message 224 to client 112. For example, message manager 201 may filter out any header in plurality of headers 228 in response message 224 that is not on preapproved list of headers 220 stored in header data structure 222.

In this manner, gateway 120 facilitates communication between client 112 and proxy server 122. Gateway 120 provides one level of authorization prior to request messages from client 112 being sent to proxy server 122. Further, gateway 120 may decouple proxy server 122 from plurality of clients 102 that are external to internal network 107 in FIG. 1. Further, gateway 120 may shield proxy server 122 from changes to the uniform resource identifiers that reference various interfaces over time.

Figure 3:
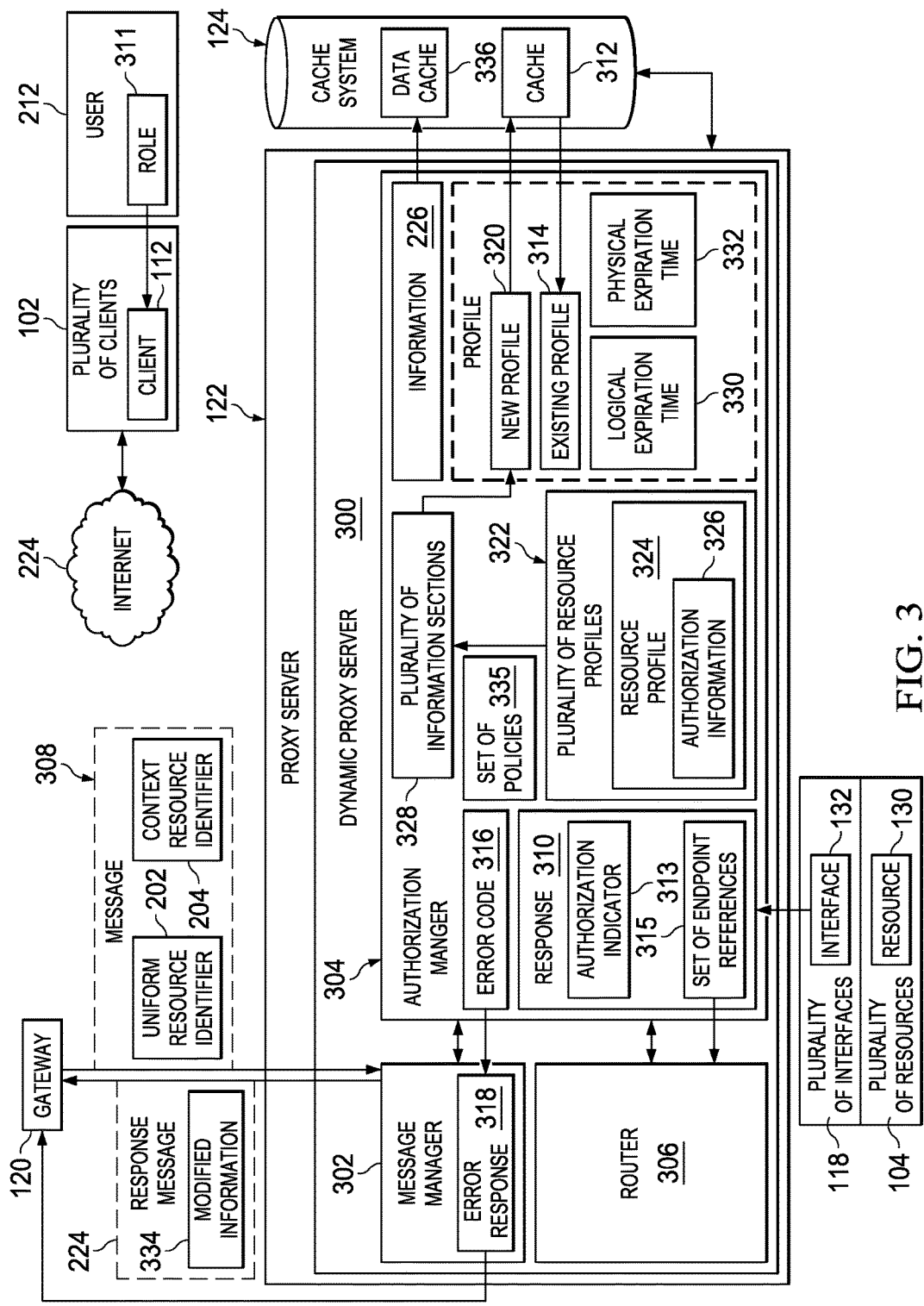
FIG. 3 is an illustration of a proxy server in the form of a block diagram in accordance with an illustrative embodiment.

With reference now to FIG. 3, an illustration of proxy server 122 from FIGS. 1-2 is depicted in the form of a block diagram in accordance with an illustrative embodiment. As depicted, proxy server 122 may also be referred to as dynamic proxy server 300.

Proxy server 122 includes message manager 302, authorization manager 304, and router 306. Each of message manager 302, authorization manager 304, and router 306 may be implemented using software, hardware, firmware, or a combination thereof.

Proxy server 122 may receive message 308 containing a context resource identifier from gateway 120. In particular, message manager 302 may receive message 308 from a client of plurality of clients 102 in FIG. 1 through gateway 120.

In one illustrative example, message 308 is modified message 216 formed by gateway 120 as described in FIG. 2. In this manner, message 308 may include the request for access to data received from client 112 on behalf of user 212. Message 308 may also include context resource identifier 204.

User 212 of client 112 may be using client 112 in a particular capacity that is defined as role 311 of user 212. Role 311 may take a number of different forms. For example, without limitation, role 311 may take the form of an employee role, a supervisor role, a project manager role, an observer role, or some other type of role. In one illustrative example, role 311 may be defined in message 308 received from client 112 through gateway 120.

After message manager 302 receives message 308, authorization manager 304 of proxy server 122 may then perform authorization of user 212 of client 112. This authorization is performed in addition to the authorization of user 212 performed by gateway 120 as described in FIG. 1.

Authorization manager 304 uses context resource identifier 204 in message 308 to identify interface 132. Authorization manager 304 then determines whether authorization is required for accessing resource 130 associated with interface 132.

As one illustrative example, authorization manager 304 contacts, or calls, interface 132. Interface 132 sends response 310 that includes authorization indicator 313 and set of endpoint references 315 to authorization manager 304. Authorization indicator 313 may indicate whether or not user authorization is required.

Set of endpoint references 315 may include one or more endpoint references. As used herein, an endpoint reference may identify the endpoint for a resource. The endpoint is the port or electronic device to which messages can be addressed. In other words, an endpoint reference conveys information for addressing an endpoint for a resource.

If authorization is not required based on authorization indicator 313 in response 310, user 212 is considered effectively authorized for access to resource 130. Router 306 of proxy server 122 then routes message 308 to resource 130 using at least one endpoint reference in set of endpoint references 315.

If authorization manager 304 determines that authorization is required for accessing resource 130 associated with interface 132, authorization manager 304 then determines whether a profile for user 212 of client 112 is present in cache 312 of cache system 124. If existing profile 314 is present for user 212 in cache 312, authorization manager 304 uses existing profile 314 to determine whether user 212 is authorized to access interface 132 referenced by context resource identifier 204.

If user 212 is not authorized to access interface 132, authorization manager 304 sends error code 316 to message manager 302. Based on error code 316, message manager 302 of proxy server 122 may then return error response 318 to gateway 120. Error response 318 may be, for example, a response message indicating that user 212 is not authorized to access resource 130 associated with interface 132. Gateway 120 may then send error response 318 to client 112 over Internet 108. In one illustrative example, receiving error response 318 at client 112 may cause a graphical representation or graphical indication of error code 316 to be displayed on to user 212.

However, if existing profile 314 indicates that user 212 is authorized to access interface 132, router 306 then routes message 308 to resource 130 using at least one endpoint reference of set of endpoint references 315. Proxy server 122 then waits to receive response message 224 from resource 130.

If a profile is not present for user 212 in cache 312, authorization manager 304 dynamically builds new profile 320 for user 212. As one illustrative example, authorization manager 304 requests plurality of resource profiles 322 from plurality of interfaces 118 that are in communication with proxy server 122. In particular, a resource profile is requested from each of plurality of interfaces 118.

Resource profile 324 is an example of one of plurality of resource profiles 322. Resource profile 324 may be received from interface 132 associated with resource 130. Authorization manager 304 may use the freshest version of resource profile 324 that is available to authorization manager 304.

In some illustrative examples, when a new resource is discovered by proxy server 122, proxy server 122 may be configured to automatically request a resource profile for the new resource and store that resource profile in cache system 124. Authorization manager 304 may use the stored resource profile if authorization manager 304 determines that the stored resource profile may still be considered up-to-date. Otherwise, authorization manager 304 may send a request for any updates to the stored resource profile or a request for an updated resource profile from the new resource. This updated resource profile may then be used to dynamically build new profile 320 for user 212.

As depicted, resource profile 324 includes authorization information 326. In some illustrative examples, resource profile 324 may include other information such as, for example, without limitation, an identification of the one or more services provided by resource 130, an endpoint for each service offered, or some other type of information. Any of the information in resource profile 324 may change over time.

In one illustrative example, authorization information 326 in resource profile 324 may identify, for example, without limitation, any and all users who are authorized to access resource 130. For example, authorization information 326 may include the user identifier for each user authorized to access resource 130. In some cases, authorization information 326 may identify a user type and indicate that all users of that user type are authorized to access resource 130.

Authorization information 326 may also indicate whether different users or user types are to be allowed different levels of access to resource 130. For example, one user may be authorized to access all data provided by resource 130, while another user may only be authorized to access a portion of the data provided by resource 130.

In another illustrative example, authorization information 326 may include different permissions for access to resource 130 based on the roles of users. For example, authorization information 326 may indicate that all users having a particular type of role may have access to resource 130.

In other illustrative examples, authorization manager 304 may request resource profile 324 that is specific to user 212 such that authorization information 326 is specific to user 212. For example, authorization information 326 may indicate whether user 212 is authorized or not authorized to access resource 130. Further, authorization information 326 may include different permissions for access to resource 130 based on role 311 of user 212.

In some illustrative examples, authorization information 326 may indicate that user 212 is to be allowed different levels of access to the data provided by resource 130 based on role 311 of user 212. For example, user 212 may be allowed to access a greater amount of data when role 311 of user 212 is a project manager role, as compared to when role 311 of user 212 is an observer role.

Each resource profile in plurality of resource profiles 322 may include authorization information similar to authorization information 326 described above. Once authorization manager 304 receives plurality of resource profiles 322 from plurality of interfaces 118 in communication with proxy server 122, authorization manager 304 extracts an information section from each resource profile of plurality of resource profiles 322 that corresponds to user 212 to form plurality of information sections 328.

Depending on the implementation, this information section may be the entirety of the authorization information in a resource profile or only a portion of the authorization information in the resource profile. Plurality of information sections 328 may then be aggregated to build new profile 320 for user 212.

New profile 320 may include a plurality of context resource identifiers that reference plurality of interfaces 118. Further, new profile 320 may include a set of permissions for user 212 that corresponds to each context resource identifier in the plurality of context resource identifiers. In one illustrative example, each permission in the set of permissions may correspond to a different possible role for user 212.

Authorization manager 304 stores new profile 320 for user 212 in cache 312 for future use. New profile 320 may be stored in cache 312 along with logical expiration time 330, physical expiration time 332, or both. As used herein, an expiration time may include a calendar date, a time, or both. In one illustrative example, logical expiration time 330 and physical expiration time 332 are included in the header or metadata associated with new profile 320.

Logical expiration time 330 may be the time at which new profile 320 may be considered no longer usable or reliable, even if new profile 320 is present in cache 312. Physical expiration time 332 may be the time at which new profile 320 is to be deleted from cache 312. In one illustrative example, logical expiration time 330 and physical expiration time 332 are the same. In another illustrative example, logical expiration time 330 and physical expiration time 332 are different.

Once new profile 320 has been created for user 212, authorization manager 304 uses new profile 320 to determine whether user 212 is authorized to access resource 130. In one illustrative example, authorization manager 304 uses new profile 320 to determine whether user 212 having role 311 is authorized to access resource 130. Further, authorization manager 304 may also use new profile 320 to determine the level of access to resource 130 that user 212 having role 311 is to be allowed.

If user 212 having role 311 is not authorized to access resource 130, authorization manager 304 sends error code 316 to message manager 302. Message manager 302 may then send error response 318 to gateway 120 based on error code 316.

However, if user 212 having role 311 is authorized to access resource 130, router 306 routes message 308 to resource 130 using at least one endpoint reference of set of endpoint references 315. Proxy server 122 then waits for a response from resource 130 that includes information requested by client 112 on behalf of user 212.

In one illustrative example, proxy server 122 receives response message 224 from resource 130 containing information 226. In some illustrative examples, authorization manager 304 filters out a portion of information 226 in response message 224, transforms at least a portion of information 226 in response message 224, or both to form modified information 334.

Set of policies 335 may be used to filter information 226, transform information 226, or both. Set of policies 335 may include at least one of a request schema validation policy, a response schema validation policy, a configurable validation policy, a data privacy filter, a payload transformation policy, or some other type of policy or filter.

Message manager 302 then sends response message 224 containing modified information 334 to gateway 120. Gateway 120 may then process response message 224 and send response message 224 to client 112.

In some illustrative examples, information 226 contained in response message 224 is stored in data cache 336 of cache system 124. In these examples, when a profile for user 212 is not present in cache 312, new profile 320 is then dynamically built. However, the process of dynamically building new profile 320 may take a certain amount of time. Thus, it may be desirable to serve older information to client 112 until new profile 320 can be built and updated information can be obtained.

For example, without limitation, if a request for the same information 226 that is already stored in data cache 336 is received from client 112 and a profile is not already present in cache 312, information 226 stored in data cache 336 may be served to client 112 while new profile 320 is being built. Once new profile 320 has been built, user 212 is authorized and updated information is received at proxy server 122. The updated information may then be sent to client 112 through gateway 120. In this manner, the older information may be displayed to user 212 through client 112 until the updated information is served to client 112. This type of process may enable user 212 to perform certain tasks more quickly. Further, this type of process may improve the overall performance of and efficiency of the tasks to be performed by user 212.

The illustrations of web services system 100 in FIG. 1, gateway 120 in FIGS. 1-3, and proxy server 122 in FIGS. 1-3 are not meant to imply physical or architectural limitations to the manner in which an illustrative embodiment may be implemented. Other components in addition to, or in place of, the ones illustrated may be used. Some components may be optional. Also, the blocks are presented to illustrate some functional components. One or more of these blocks may be combined, divided, or combined and divided into different blocks when implemented in an illustrative embodiment.

Figure 4:
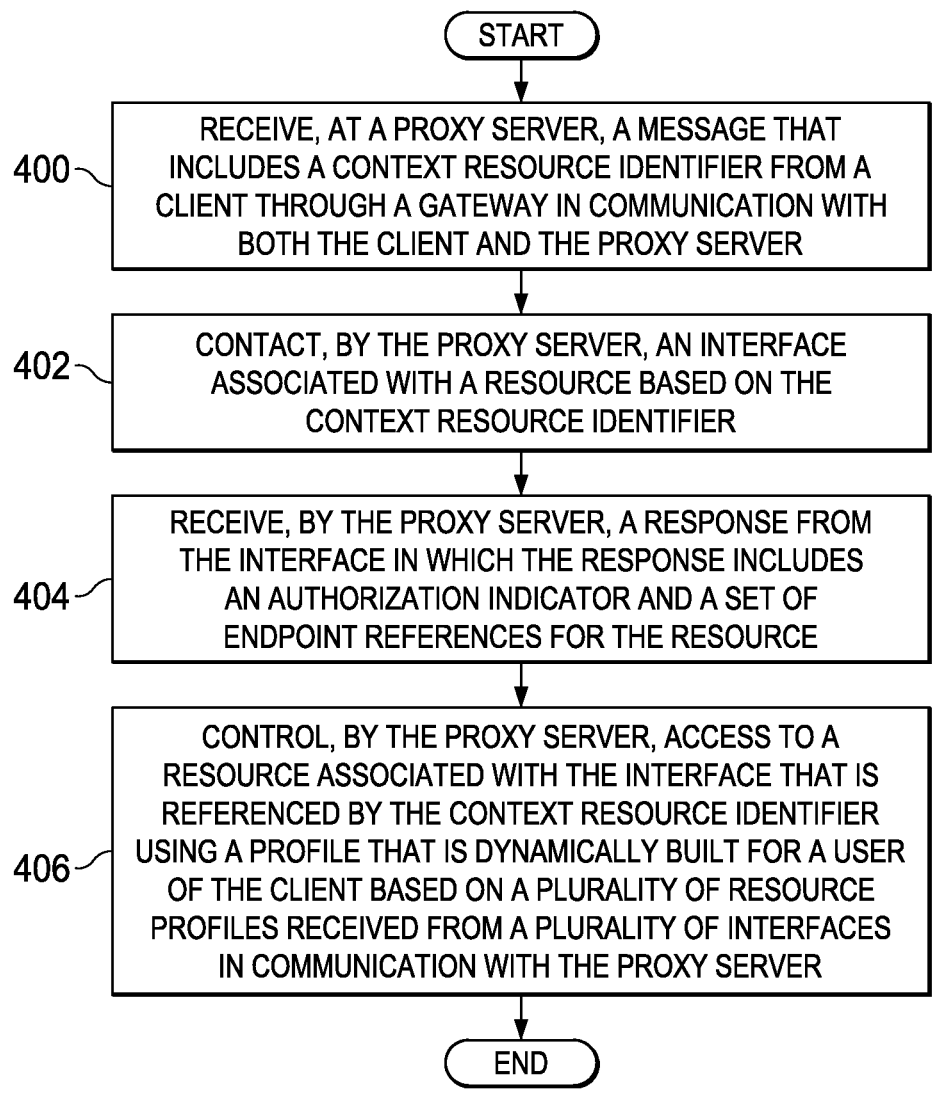
FIG. 4 is an illustration of a process for facilitating access to a plurality of resources in the form of a flowchart in accordance with an illustrative embodiment.

With reference now to FIG. 4, an illustration of a process for facilitating access to a plurality of resources is depicted in the form of a flowchart in accordance with an illustrative embodiment. The process illustrated in FIG. 4 may be implemented using proxy server 122 described in FIGS. 1-3.

The process may begin by receiving, at a proxy server, a message that includes a context resource identifier from a client through a gateway in communication with both the client and the proxy server (operation 400). The proxy server then contacts an interface associated with a resource based on the context resource identifier (operation 402). In operation 402, the interface is an application programming interface.

The proxy server receives a response from the interface in which the response includes an authorization indicator and a set of endpoint references for the resource (operation 404). Thereafter, the proxy server controls access to a resource associated with the interface that is referenced by the context resource identifier using a profile that is dynamically built for a user of the client based on a plurality of resource profiles received from a plurality of interfaces in communication with the proxy server (operation 406), with the process terminating thereafter.

Figure 5:
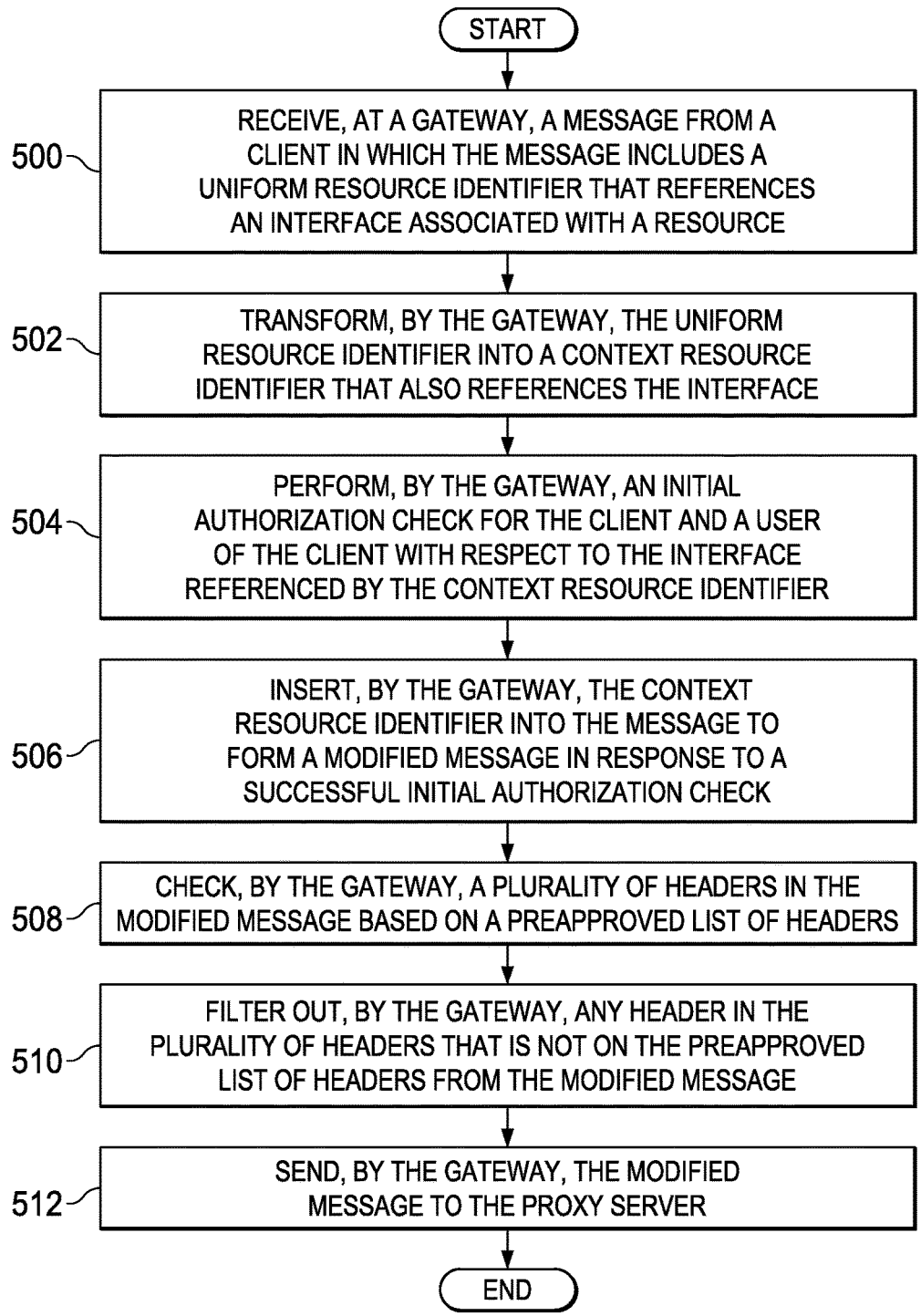
FIG. 5 is an illustration of a process for facilitating communication between a client and a proxy server in the form of a flowchart in accordance with an illustrative embodiment.

With reference now to FIG. 5, an illustration of a process for facilitating communication between a client and a proxy server is depicted in the form of a flowchart in accordance with an illustrative embodiment. The process illustrated in FIG. 5 may be implemented using gateway 120 described in FIGS. 1-3.

The process may begin by receiving, at a gateway, a message from a client in which the message includes a uniform resource identifier that references an interface associated with a resource (operation 500). In operation 500, the message received may be a request message that is requesting access to data provided by the resource on behalf of a user of the client.

The gateway transforms the uniform resource identifier into a context resource identifier that also references the interface (operation 502). The gateway performs an initial authorization check for the client and a user of the client with respect to the interface referenced by the context resource identifier (operation 504).

Thereafter, the gateway inserts the context resource identifier into the message to form a modified message in response to a successful initial authorization check (operation 506). The gateway checks a plurality of headers in the modified message based on a preapproved list of headers stored in a header data structure (operation 508). The gateway then filters out any header in the plurality of headers that is not on the preapproved list of headers from the modified message (operation 510). Thereafter, the gateway sends the modified message to the proxy server (operation 512), with the process terminating thereafter.

Figure 6:
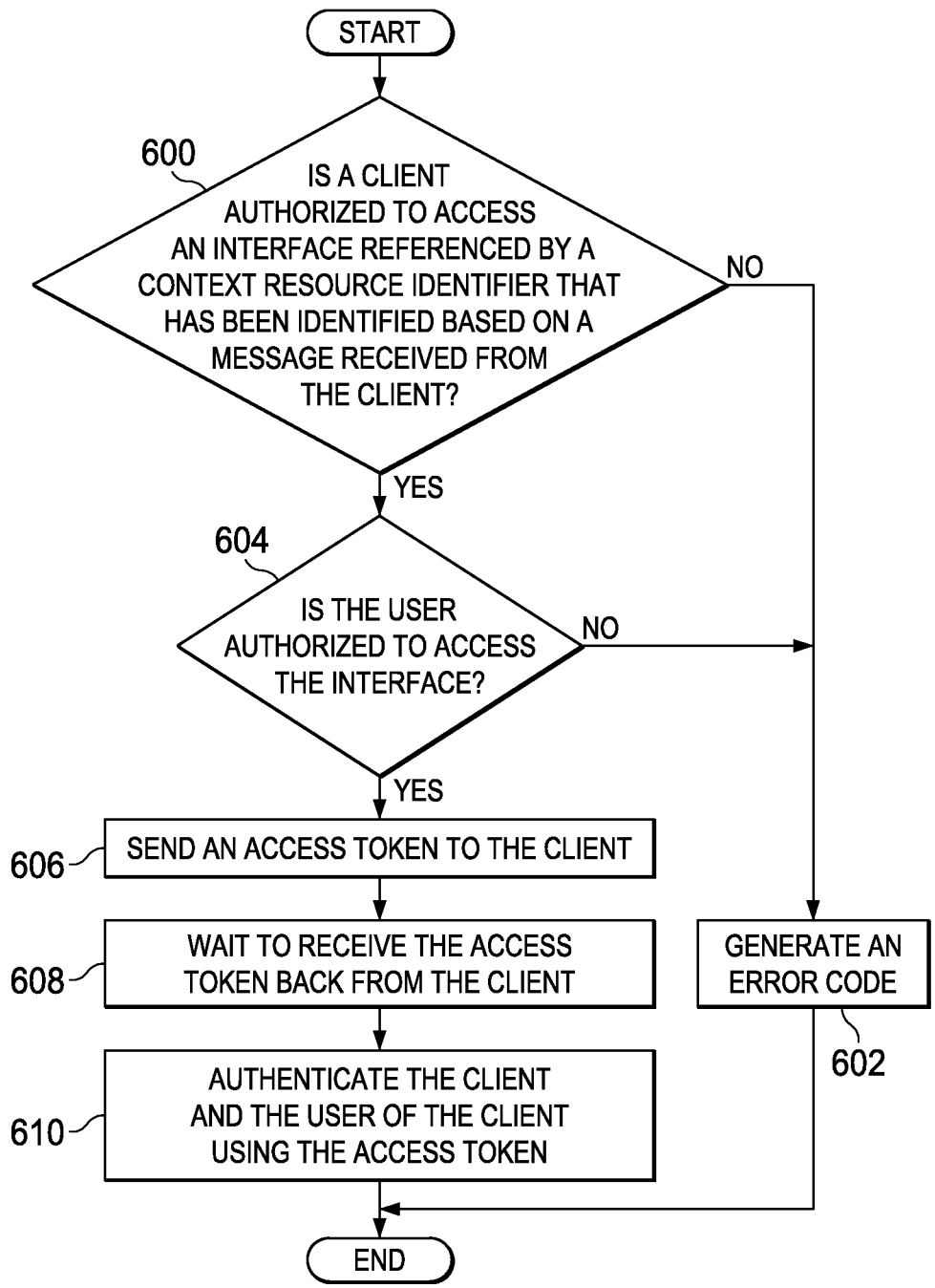
FIG. 6 is an illustration of a process for performing an initial authorization check in the form of a flowchart in accordance with an illustrative embodiment.

With reference now to FIG. 6, an illustration of a process for performing an initial authorization check is depicted in the form of a flowchart in accordance with an illustrative embodiment. The process described in FIG. 6 may be implemented using gateway 120 described in FIGS. 1-3. Further, the process described in FIG. 6 may be used to implement operation 504 described in FIG. 5.

The process begins by determining whether a client is authorized to access an interface referenced by a context resource identifier that has been identified based on a message received from the client (operation 600). This context resource identifier may be, for example, the context resource identifier formed in operation 502 in FIG. 5.

If the client is not authorized to access the interface, an error code is generated (operation 602), with the process terminating thereafter. This error code may then be sent in a response message back to the client.

With reference again to operation 600, if the client is authorized to access the interface, a determination is made as to whether the user is authorized to access the interface (operation 604). In one illustrative example, operation 604 may be performed by determining whether the user has a current and valid subscription to the resource associated with the interface.

If the user is not authorized to access the interface, the process proceeds to operation 602 described above. Otherwise, an access token is sent to the client (operation 606).

The process then waits to receive the access token back from the client (operation 608). The client and the user of the client are then both authenticated using the access token (operation 610), with the process terminating thereafter.

Figure 7:
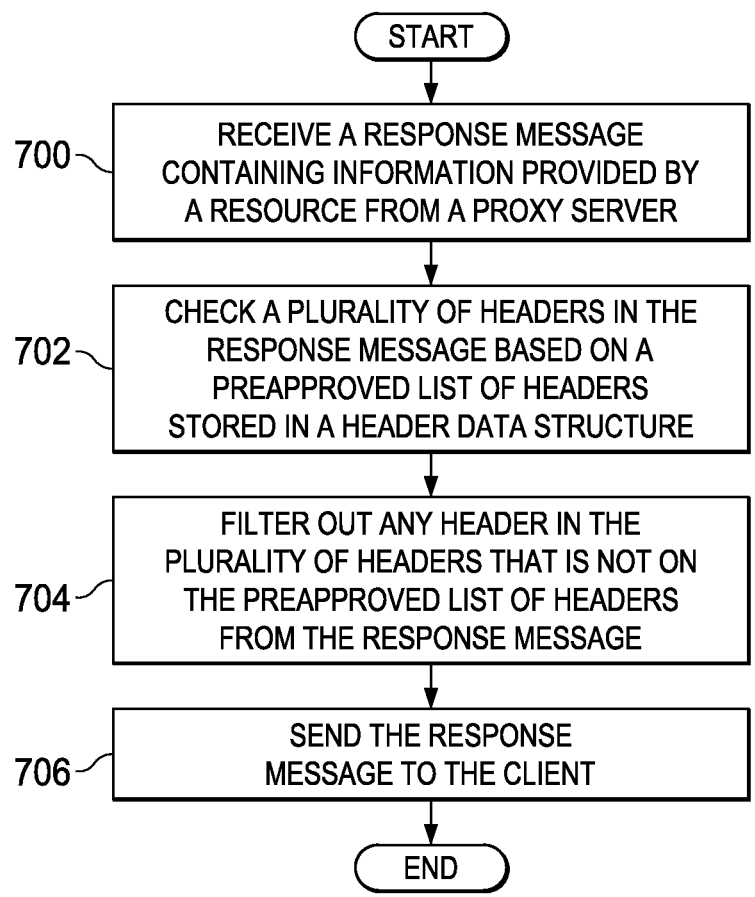
FIG. 7 is an illustration of a process for facilitating communication between a proxy server and a client in the form of a flowchart in accordance with an illustrative embodiment.

With reference now to FIG. 7, an illustration of a process for facilitating communication between a proxy server and a client is depicted in the form of a flowchart in accordance with an illustrative embodiment. The process described in FIG. 7 may be implemented using gateway 120 described in FIGS. 1-3.

The process begins by receiving a response message containing information provided by a resource from a proxy server (operation 700). A plurality of headers in the response message are checked based on a preapproved list of headers stored in a header data structure (operation 702).

Any header in the plurality of headers that is not on the preapproved list of headers is filtered out from the response message (operation 704). The response message is then sent to the client (operation 706), with the process terminating thereafter.

Figure 8:
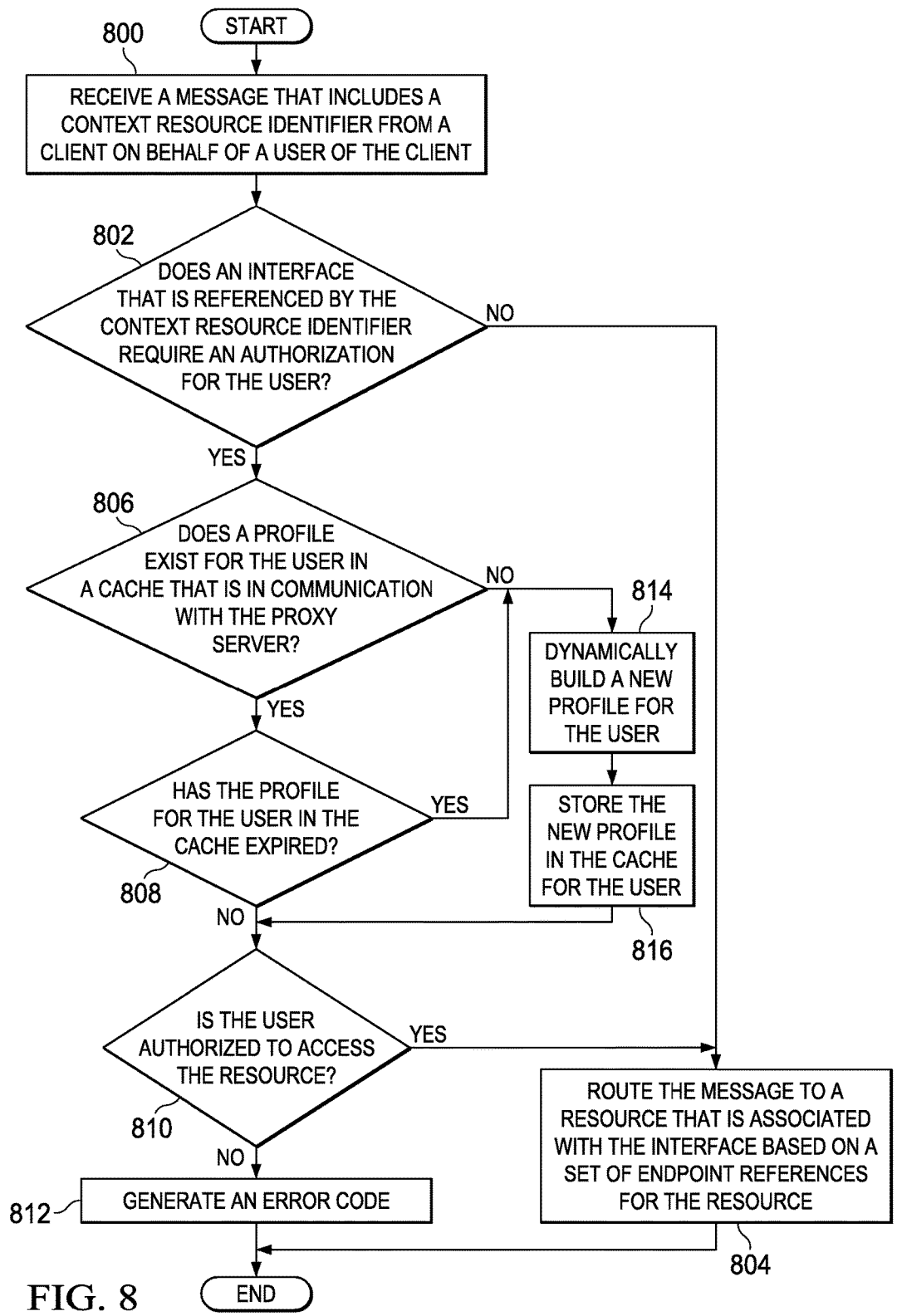
FIG. 8 is an illustration of a process for authorizing a user for access to a resource in the form of a flowchart in accordance with an illustrative embodiment.

With reference now to FIG. 8, an illustration of a process for authorizing a user for access to a resource is depicted in the form of a flowchart in accordance with an illustrative embodiment. The process illustrated in FIG. 8 may be implemented using proxy server 122 described in FIGS. 1-3.

The process begins by receiving a message that includes a context resource identifier from a client on behalf of a user of the client (operation 800). In operation 800, the message may originate from the client, but is received through a gateway that is in communication with both the client and the proxy server. Further, the message may have been modified by the gateway to include the context resource identifier.

Next, a determination is made as to whether an interface that is referenced by the context resource identifier requires an authorization for the user (operation 802). If authorization is not required, the message is routed to a resource that is associated with the interface based on a set of endpoint references for the resource (operation 804), with the process terminating thereafter.

The routing performed in operation 804 to the particular resource may be performed based on various routing parameters. These routing parameters may include, for example, without limitation, the type of the resource, a product subscription or service authorization associated with the resource, a service instance, one or more context parameters, or some other type of routing parameter.

With reference again to operation 802, if authorization is required, a determination is made as to whether a profile exists for the user in a cache that is in communication with the proxy server (operation 806). If a profile does exist for the user in the cache, a determination is made as to whether the profile for the user in the cache has expired (operation 808). In operation 808, this determination may be made based on a logical expiration time associated with the profile for the user.

If the profile for the user in the cache has not expired, a determination is made as to whether the user is authorized to access the resource based on the profile in the cache and a role of the user (operation 810). If the user is authorized to access the resource, the process proceeds to operation 804 as described above.

Otherwise, if the user is not authorized to access the resource, an error code is generated (operation 812), with the process terminating thereafter. In one illustrative example, this error code may then be sent to the client through the gateway in the form of an error response message.

With reference again to operation 806 and operation 808, if either the profile for the user does not exist in the cache or a profile for the user in the cache has expired, the process dynamically builds a new profile for the user (operation 814). The new profile is stored in the cache for the user (operation 816). The process then proceeds to operation 810 described above.

Figure 9:
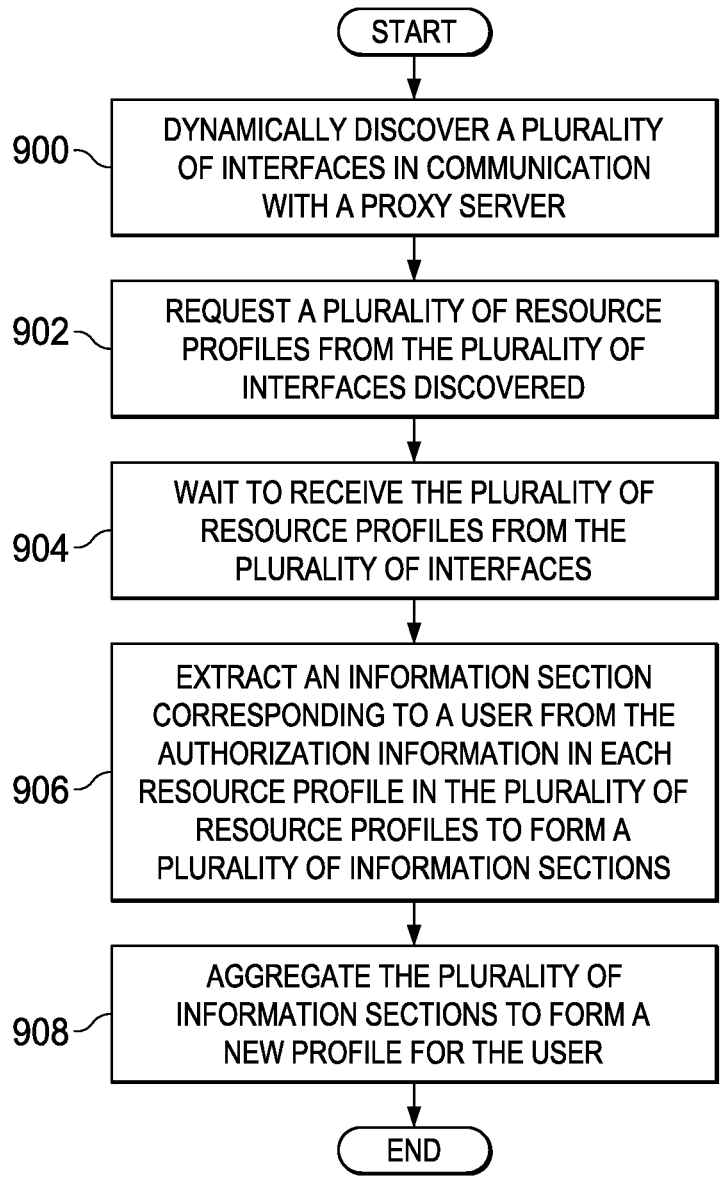
FIG. 9 is an illustration of a process for dynamically building a new profile for a user in the form of a flowchart in accordance with an illustrative embodiment.

With reference now to FIG. 9, an illustration of a process for dynamically building a new profile for a user is depicted in the form of a flowchart in accordance with an illustrative embodiment. The process illustrated in FIG. 9 may be implemented using proxy server 122 in FIGS. 1-3. Further, this process may be used to implement operation 814 described in FIG. 8.

The process begins by dynamically discovering a plurality of interfaces in communication with a proxy server (operation 900). A plurality of resource profiles are requested from the plurality of interfaces discovered (operation 902).

The process then waits to receive the plurality of resource profiles from the plurality of interfaces (operation 904). An information section corresponding to a user is then extracted from the authorization information in each resource profile in the plurality of resource profiles to form a plurality of information sections (operation 906). Thereafter, the plurality of information sections are aggregated to form a new profile for the user (operation 908), with the process then terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
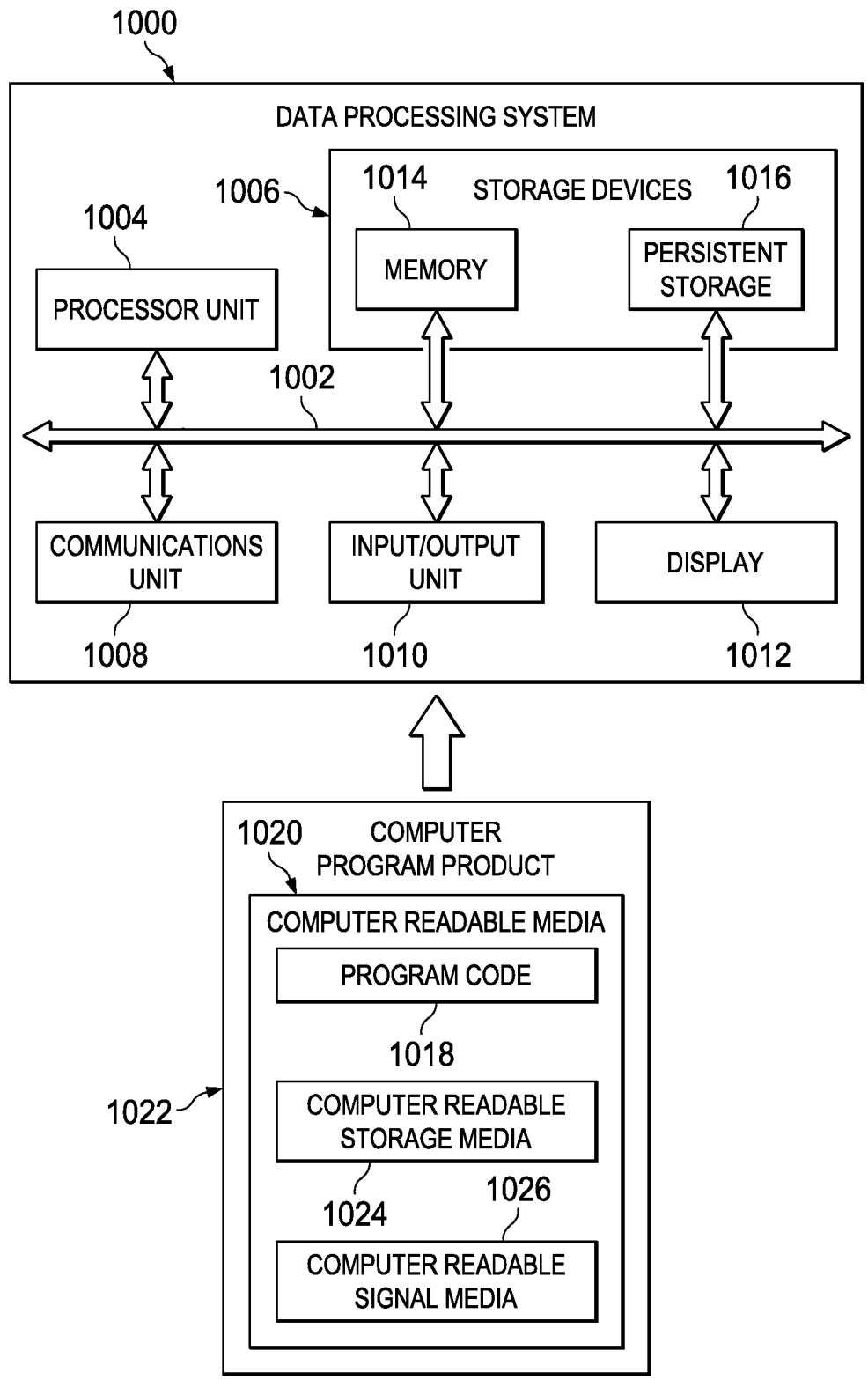
FIG. 10 is an illustration of a data processing system in the form of a block diagram in accordance with an illustrative embodiment.

Turning now to FIG. 10, an illustration of a data processing system in the form of a block diagram is depicted in accordance with an illustrative embodiment. Data processing system 1000 may be used to implement proxy server 122, gateway 120, or both from FIGS. 1-2. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise a number of processors, a multi-processor core, and/or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary and/or permanent basis. This information may include, but is not limited to, data, program code, and/or other information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems and/or devices. Communications unit 1008 may provide communications using physical and/or wireless communications links.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, and/or some other type of display device.

In this illustrative example, the processes of the different illustrative embodiments may be performed by processor unit 1004 using computer-implemented instructions. These instructions may be referred to as program code, computer usable program code, or computer readable program code and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018, rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, and/or some other type of signal that can be transmitted over physical and/or wireless communications links.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

In this manner, the illustrative embodiments provide a method and apparatus for facilitating communications between clients and resources. The illustrative embodiments provide an intelligent application programming interface proxy server that automatically discovers authorization application programming interfaces for connected resources, builds a profile for a user for the connected resources, and authorizes the user for access on behalf of connected resources accordingly. The authorization provided by the intelligent, dynamic proxy server described above may dynamically discover authorization needs or desires for connected resources and build a profile for a user for authorization with all connected resources, greatly reducing time of development.

Further, the illustrative embodiments provide a gateway that decouples the dynamic proxy server from the clients. The gateway helps facilitate communications between the client and the dynamic proxy server.

The illustrative embodiments provide a proxy server and a gateway that form a system for managing access to resources that is both dynamic and distributed. In particular, this system allows participants, which may include resources, clients, or both, to join or leave the system in an organic fashion. The dynamic proxy server described by the illustrative embodiments allows the overall system to be organic and fluid in that clients and resources may join and leave over time. In some illustrative examples, a uniform interface may be used for implementing dynamic discovery and learning mechanisms to allow, for example, the proxy server to learn about new participants and dynamically add these participants to a corresponding network. Thus, the system may be scalable over time.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method for facilitating access to a plurality of resources, the method comprising:
   receiving, at a proxy server, a modified message from a gateway in communication with both a client and the proxy server, wherein the modified message includes a context resource identifier inserted by the gateway into a message received from the client;
   determining, by the proxy server, whether an application programming interface referenced by the context resource identifier requires an authorization for a user;
   in response to a determination that the application programming interface requires the authorization for the user, determining, by the proxy server, whether a profile for the user is present within a cache that is in communication with the proxy server;
   in response to a determination that the profile for the user is not present within the cache:
   dynamically discovering, by the proxy server, a plurality of application programming interfaces that are in communication with the proxy server;
   obtaining, by the proxy server, a plurality of resource profiles from the plurality of application programming interfaces, wherein each resource profile includes a set of endpoint references and authorization information; and
   dynamically building, by the proxy server, the profile for the user that includes at least a portion of the authorization information in each of the plurality of resource profiles and a set of context resource identifiers for the plurality of application programming interfaces; and
   controlling, by the proxy server, access to a resource associated with the application programming interface that is referenced by the context resource identifier using the profile for the user.

2. The method of claim 1 wherein controlling, by the proxy server, access to the resource further comprises:
   in response to dynamically building the profile, storing, by the proxy server, the profile in the cache in association with a logical expiration time and a physical expiration time for the profile for the user.

3. The method of claim 2, wherein controlling, by the proxy server, access to the resource further comprises:
   in response to the gateway validating a subscription corresponding to an organization using the client with respect to the context resource identifier inserted by the gateway, determining, by the proxy server, whether the user is authorized to access the resource based on the profile for the user and a role of the user in the organization; and
   in response to a determination that the user is authorized to access the resource, routing the modified message to the resource based on the context resource identifier inserted by the gateway.

4. The method of claim 3, wherein controlling, by the proxy server, access to the resource further comprises:
   generating, by the proxy server, an error code in response to a determination that the user is not authorized to access the resource; and
   sending, by the proxy server, the error code to the client through the gateway.

5. The method of claim 2, wherein dynamically building the profile for the user comprises:
   obtaining the plurality of resource profiles from the plurality of application programming interfaces, wherein each resource profile in the plurality of resource profiles is generated by a corresponding application programming interface in the plurality of application programming interfaces and includes a corresponding set of endpoint references and corresponding authorization information; and
   building the profile for the user based on the corresponding authorization information in each of the plurality of resource profiles.

6. The method of claim 5 further comprising:
   storing the set of endpoint references received in the each of the plurality of resource profiles in an endpoint data structure.

7. The method of claim 1, wherein controlling, by the proxy server, access to the resource further comprises:
   determining whether the user is authorized to access the resource based on the profile for the user; and
   routing the message to the resource in response to a determination that the user is authorized to access the resource.

8. The method of claim 1, wherein controlling, by the proxy server, access to the resource further comprises:

routing the message to the resource based on a set of endpoint references for the resource when the user of the client is authorized to access the resource;

receiving, at the proxy server, information from the resource through the application programming interface; and sending, by the proxy server, the information to the client through the gateway.

9. The method of claim 8 further comprising:

storing, by the proxy server, the information in a data cache.

10. The method of claim 1, wherein controlling, by the proxy server, access to the resource comprises:

receiving information from the resource through the application programming interface after the user of the client has been authorized for access to the resource;

filtering the information based on a data privacy filter to form modified information; and sending the modified information to the client through the gateway.

11. An apparatus comprising:

a plurality of resources; and a proxy server in communication with the plurality of resources, wherein the proxy server is configured:

to receive a modified message from a gateway in communication with both a client and the proxy server, wherein the modified message includes a context resource identifier inserted by the gateway into a message received from the client;

to determine whether an application programming interface referenced by the context resource identifier requires an authorization for a user;

in response to a determination that the application programming interface requires the authorization for the user, to determine whether a profile for the user is present within a cache that is in communication with the proxy server;

in response to a determination that the profile for the user is not present within the cache:

to dynamically discover a plurality of application programming interfaces that are in communication with the proxy server;

to obtain a plurality of resource profiles from the plurality of application programming interfaces, wherein each resource profile includes a set of endpoint references and authorization information; and to dynamically build the profile for the user that includes at least a portion of the authorization information in each of the plurality of resource profiles and a set of context resource identifiers for the plurality of application programming interfaces; and to control access to a resource associated with the application programming interface that is referenced by the context resource identifier using the profile for the user.

12. The apparatus of claim 11, wherein the proxy server comprises:

an authorization manager that determines whether the user of the client is authorized to access the resource using the profile for the user.

13. The apparatus of claim 12, wherein the proxy server comprises:

a router that routes the message to the resource based on a set of endpoint references for the resource after the user has been authorized to access the resource.

14. The apparatus of claim 12 further comprising:

the cache in communication with the proxy server, wherein the authorization manager determines whether the user is authorized to access the resource based on the profile for the user stored in the cache.

15. The apparatus of claim 11, wherein the profile is stored in the cache along with a logical expiration time and a physical expiration time for the profile.

16. The apparatus of claim 11, wherein the profile comprises:

a set of permissions for the user corresponding to each context resource identifier in the set of context resource identifiers, wherein each permission in the set of permissions corresponds to a different role of the user.

17. The apparatus of claim 11, wherein each resource profile in the plurality of resource profiles includes a corresponding set of endpoint references and corresponding authorization information.

18. The apparatus of claim 11, wherein the proxy server and the gateway form a dynamic and distributed system for facilitating communications between various clients and various resources that allows clients and resources to join and leave the dynamic and distributed system over time.

* * * * *